Jan. 12, 1954 R. L. TRENT 2,665,845

TRANSISTOR TRIGGER CIRCUIT FOR OPERATING RELAYS

Filed Oct. 8, 1952 2 Sheets-Sheet 1

INVENTOR
R. L. TRENT
BY H. A. Burgess
ATTORNEY

Jan. 12, 1954 R. L. TRENT 2,665,845

TRANSISTOR TRIGGER CIRCUIT FOR OPERATING RELAYS

Filed Oct. 8, 1952 2 Sheets-Sheet 2

INVENTOR
R. L. TRENT
BY H. A. Burgess
ATTORNEY

Patented Jan. 12, 1954 2,665,845

UNITED STATES PATENT OFFICE 2,665,845

TRANSISTOR TRIGGER CIRCUIT FOR OPERATING RELAYS

Robert L. Trent, Far Hills, N. J., assignor to Bell Telephone Laboratories, Incorporated, New York, N. Y., a corporation of New York Application October 8, 1952, Serial No. 313,762

10 Claims. (Cl. 235—92)

This invention relates to electrical circuits employing transistors.

Transistors are limited in their operation by the maximum power which may safely be dissipated. Excessive power dissipation may permanently impair the unit whether it be a point contact device or a junction type transistor. (For descriptions of the various types of transistors, reference may be made to the following articles which appear in the Bell System Technical Journal, "Some Circuit Aspects of the Transistor," by R. M. Ryder and R. J. Kircher, July 1949, and "Some Circuit Properties and Application of n-p-n Transistors" by R. L. Wallace and W. J. Pietenpol, July 1951.) This failure is known as "burn-out" and is caused at least in part by thermal effects which destroy or appreciably impair the contact formed by the electrode with the semiconductor body; this contact may, for example, be the rectifying barrier formed by the collector electrode.

It is an object of the invention to deliver maximum permissible power to a load circuit over a range of operating currents without exceeding the safe power dissipation limits. More particularly, it is desired to achieve the foregoing object even though the safe power dissipation curve as plotted over the desired range of operating currents may be non-linear.

Another object of the invention is a branch load circuit in which very small currents flow in the "off" condition and large currents flow in the "on" condition. A more particular object is the reliable operation of a relay by a transistor trigger circuit.

Other objects and features of the invention may be better understood from a consideration of the following detailed description when read in accordance with the attached drawings, in which.

Figure 1:
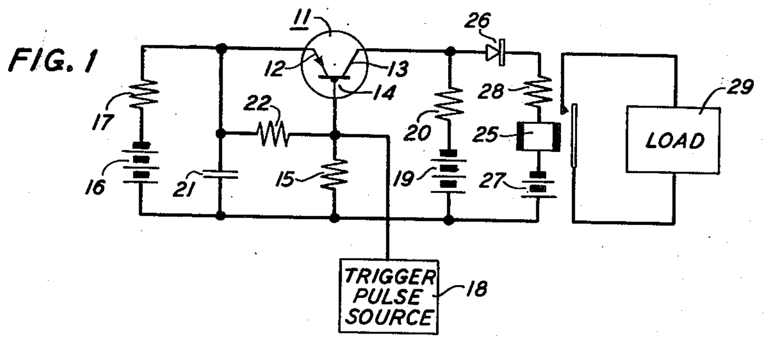
Fig. 1 is a schematic diagram of a transistor trigger circuit connected to operate a relay in accordance with principles of the invention.

The circuit of Fig. 1 includes a transistor trigger circuit of the type disclosed and claimed in a copending application of A. E. Anderson, Serial No. 166,733, filed June 7, 1950. The central element of this circuit is the current multiplication transistor 11 having an emitter electrode 12, a collector electrode 13, and a base electrode 14. The resistor 15 connected to the base electrode is relatively large and provides sufficient regenerative feedback over a range of positive emitter current to give rise to a region of negative resistance in the emitter current versus emitter voltage characteristic of the transistor. The operating points are determined primarily by the voltage of the emitter biasing battery 16 and the magnitude of the resistor 17. By proper proportioning of these two elements, the circuit may be made either monostable, astable, or bistable; the present circuit is assumed to be bistable. Triggering pulses which are assumed to be alternately negative and positive are applied to the base electrode from the trigger pulse source 18. The collector current is supplied by the collector supply battery 19 which is connected in series with the load resistor 20. If the circuit is "off," i. e., if the emitter current is negative and the collector current is quite small, a negative pulse applied to the base electrode will turn the circuit "on"; the "on" condition is characterized by a large collector current. A subsequent positive pulse applied to the base electrode will turn the circuit "off." The rate of change between the "on" and "off" conditions is determined primarily by the condenser 21, the base resistor 15, the collector supply battery 19, and the resistor 20. The resistor 22 which shunts the emitter and base electrodes aids in stabilizing the "off" trigger point and also speeds up recovery time in the negative emitter current region.

The trigger circuit just described is connected to operate relay 25 which when operated closes a circuit to the load 29. To operate the relay 25, it is desirable to supply as much current as possible when the trigger circuit is "on." As noted above, however, care must be taken not to exceed the safe power dissipation limits of the transistor which, if exceeded, may burn out the collector electrode.

Figures 2, 3:
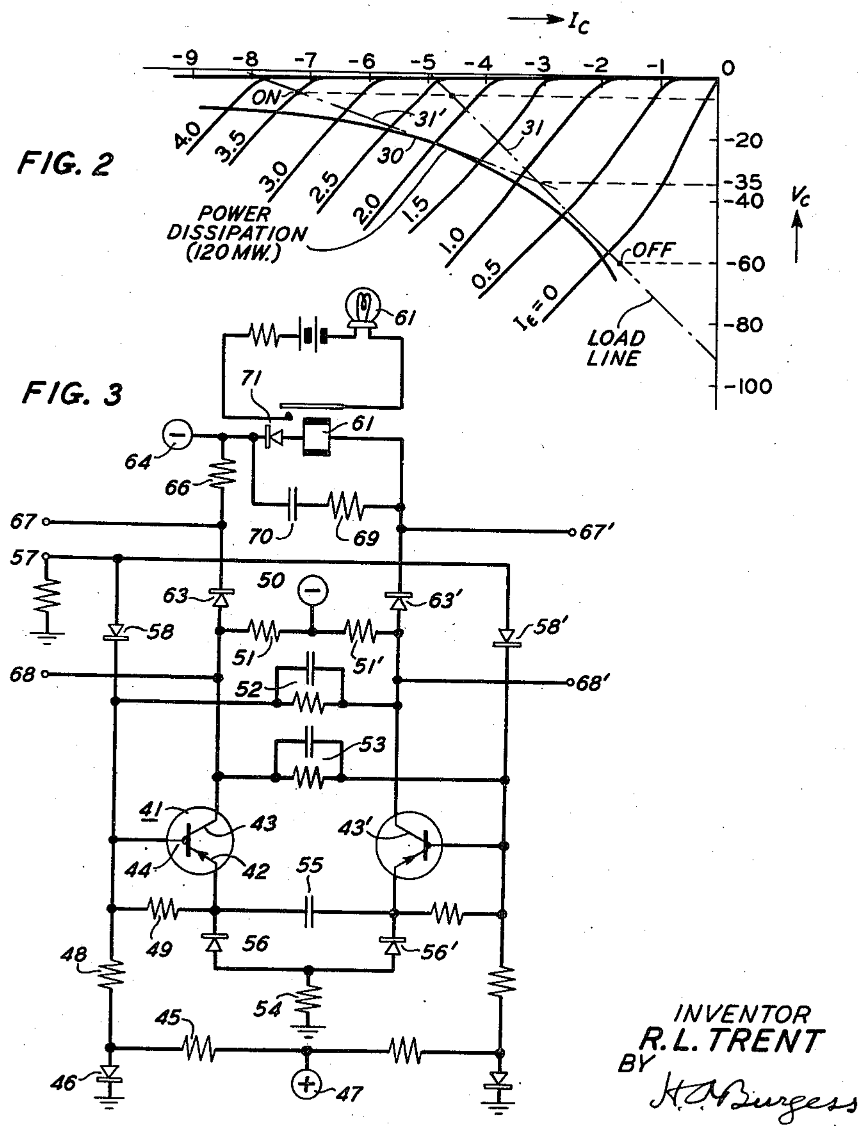
Fig. 2 illustrates operating characteristics of the circuit of Fig. 1.
Fig. 3 is a schematic diagram of a bistable circuit embodying principles of the present invention.

The curve 30 in Fig. 2 is drawn through points of equal power dissipation and in particular at a dissipation where danger of exceeding the power handling capabilities of the transistor will not occur (in the figure, approximately 120 milliwatts). This curve is approximately a hyperbola, asymptotic to the axes. The curve 31 is the load line of the trigger circuit as determined by the magnitude of resistor 20 and the voltage of the collector supply battery 19, ignoring for the present the branch load circuit including the relay winding 25. This load line has been proportioned so as to stay on the safe side of the safe power dissipation curve. In the "off" condition, the circuit rests at an operating point on the load line at −60 volts collector voltage. When the circuit is "on," the collector voltage is approximately −10 volts, therefore fixing the "on" operating point at a collector current of about 4.5 milliamperes.

It may be seen from the curves of Fig. 2 that much more current and, therefore, more power could be delivered to the load circuits in the "on" condition without exceeding the safe power dissipation. In particular, this could be achieved if the load line approximated the safe power dissipation curve 30. Usually the load line chosen, such as load line 31, is a compromise with the impressed voltage of battery 19 and resistor 20 so chosen that the maximum dissipation will not be exceeded in the "off" condition, resulting in relatively low dissipation in the "on" condition, as shown.

In accordance with principles of the invention, there is connected in the branch load circuit an asymmetrically conducting impedance element 26 which may, for example, comprise a germanium crystal diode. This diode is biased by the battery 27. The voltage of battery 27 is chosen so as to be always less negative than the lowest voltage assumed by the collector electrode in the "off" condition. This insures that the diode 26 in series with the relay winding 25 and the resistor 28 will always be in its high resistance condition when the circuit is "off". The choice of the resistor 28 depends upon the transistor current in the "on" condition and is limited only by the maximum dissipation allowance; in a practical case, the winding of relay 25 may have a high enough value of resistance so that an additional resistor 28 will not be needed.

The connection of the diode 26 in the branch load circuit modifies the load line 31 as indicated by the new load line 31′. In the "off" condition, the branch load circuit is substantially out of the circuit so that, in this condition, the load line is determined primarily by the battery 19 and resistor 20 as above. In the transition from "off" to "on," however, a collector voltage is reached, in the figure approximately −35 volts, exceeding in a positive sense the voltage of battery 27 so that diode 26 assumes its low resistance condition. This puts a low shunting resistance on the load line resistor 20 and reduces the slope of the load line to that indicated by the load line 31′. Therefore, when the circuit reaches the "on" condition at −10 volts collector voltage, there will be a collector current of over 7 milliamperes flowing, representing a substantial increase in the power delivered to the load without exceeding the safe dissipation represented by the curve 30.

As before, the voltage of battery 19 and the resistor 20 are chosen so that the dissipation in the "off" condition is not exceeded. The choice of resistor 20 will also depend in part on the impedance of any external circuit in addition to those illustrated, which may be connected to the collector.

The circuit as just described permits the characteristics of the transistor to be utilized to the greatest extent possible without exceeding the dissipation limits. The bent load line permits the maximum current swing and at the same time the maximum voltage swing.

The connection of the diode 26 in the branch load circuit obtains another feature for the circuit, namely, very small currents flow in the branch load circuit in the "off" condition. This is particularly important in relay operation to prevent lock-up of the relay. This is also a unique consideration with transistor circuits, since a small collector current flows even when the emitter current is zero or negative. Further, this collector current in the "off" condition may vary appreciably from unit to unit or with variations in temperature. The diode 26, however, inserts a high resistance in the branch load circuit in the "off" condition, thereby limiting the current through the relay in the "off" condition to a very small value.

It may seem that if the transition from "off" to "on" is very rapid that it would be permissible to operate with a load line which intersected the safe power dissipation curve so long as the maximum dissipation were not exceeded in the "on" or "off" conditions. This will, however, often be an unwarranted assumption since burnout may occur even though the maximum power is exceeded but for a very short time.

Fig. 3 illustrates a stage of a transistor binary counter employing circuit modifications in accordance with the invention. The binary counter stage is similar to the one shown and described in a copending application of A. E. Anderson and R. L. Trent, Serial No. 246,833, filed September 15, 1951, which issued as Patent 2,622,212, dated December 16, 1952. Each half of the counter is a transistor trigger circuit of the type shown and described in a copending application of mine Serial No. 223,522, filed April 28, 1951, which issued as Patent 2,622,211, dated December 16, 1952. The left-hand trigger circuit, for example, includes a transistor 41 having an emitter electrode 42, a collector electrode 43, and a base electrode 44. The resistor 45 connected to the base electrode has a function similar to resistor 15 in Fig. 1, is relatively large and promotes the regenerative feedback from the collector circuit to the emitter circuit which gives the circuit its triggering properties. This resistor is effectively switched in and out of the base circuit by the diode 46 which is biased from the positive supply 47; the resistor 45 is switched out of the circuit for negative emitter currents when the diode 46 is a low resistance and is switched in the circuit to promote the regeneration for positive emitter currents. This expedient stabilizes the "off" trigger point. The resistor 48 insures sufficient regeneration to trigger the circuit when the emitter current becomes positive even though the diode 46 may not switch to its high resistance condition exactly at zero emitter current. The function of this resistor is disclosed more fully in my copending application Serial No. 223,522 filed April 28, 1951, which issued as Patent 2,622,211, dated December 16, 1952. Resistor 49 has a function similar to that of the resistor 22 in the circuit of Fig. 1. Voltage is supplied to the collector electrode from the source 50 through the collector resistor 51.

The right-hand trigger circuit is similar to the one just described; similar elements have been given similar numbers with the addition of primes. The two trigger circuits are interconnected by the condenser-resistor combinations 52 and 53 which cross-connect the collector and base electrodes of the two transistors, by the resistor 54, which is common to both emitter circuits, and by the coupling condenser 55. The diodes 56 and 56′ promote trigger sensitivity by raising the emitter potential of the "off" unit to a voltage quite near the triggering potential.

When one trigger circuit is "on," the other one will be "off." Successive trigger pulses applied to the input terminal 57 will reverse the conductive states of the two circuits. The trigger pulses which are positive in polarity are steered to the base electrode of the "on" unit by means of the steering diodes 58 and 58'. These diodes are biased by the difference in potential of the base electrodes of the two transistors. A positive pulse applied to the base electrode of the "on" unit will tend to turn that unit "off" and will also be applied by way of condenser 55 to the emitter electrode of the "off" unit, tending to turn the latter unit "on." The action becomes cumulative due to the cross-connections provided by the condenser-resistor combinations 52 and 53.

The indicating lamp 61 will be illuminated when the right-hand trigger circuit is "on" and the left-hand trigger circuit is "off"; the relay 62 will be operated under such condition. Further, the binary counter stage is registering a "1" under such conditions by initial assumption. The diode 63' performs a function similar to that of the diode 26 in Fig. 1, being connected in a branch circuit shunting the collector supply 50 and the resistor 51'; the branch circuit includes the winding of relay 62 and the negative supply 64 which biases the diode 63' in its high resistance condition when the trigger circuit associated with transistor 43' is "off." The diode 63 and resistor 66 are inserted in the circuit to provide balanced loads to the two collectors i. e., to compensate for the impedance of the diode 63' and the direct current resistance of the relay 62 winding. Outputs may be taken from either terminals 67, 67' or 68, 68' as desired. The resistor 69 and capacitor 70 are connected in shunt with the winding of relay 64 to compensate for the large inductance of the latter and to make the relay winding appear as close as possible as a resistance to permit operation at a fairly high rate. The diode 71 prevents oscillating currents from building up in the loop comprising the relay winding 64, resistor 69, and capacitor 70.

When the right-hand trigger circuit is "on" and the left-hand trigger circuit is "off," the collector electrode 43' will be at approximately −10 volts and the collector electrode 43 at approximately −60 volts. Under this condition, the diode 63' will be in its low resistance condition and diode 63 will be in its high resistance condition, and current will flow from source 64 through the winding of relay 62 operating the relay and energizing the lamp 61. When the left-hand trigger circuit is "on" and the right-hand trigger circuit "off," the impedance conditions of the diodes 63 and 63' will be reversed, substantially no current will flow through the winding of relay 62, and the relay will remain unoperated.

Figures 4, 4A:
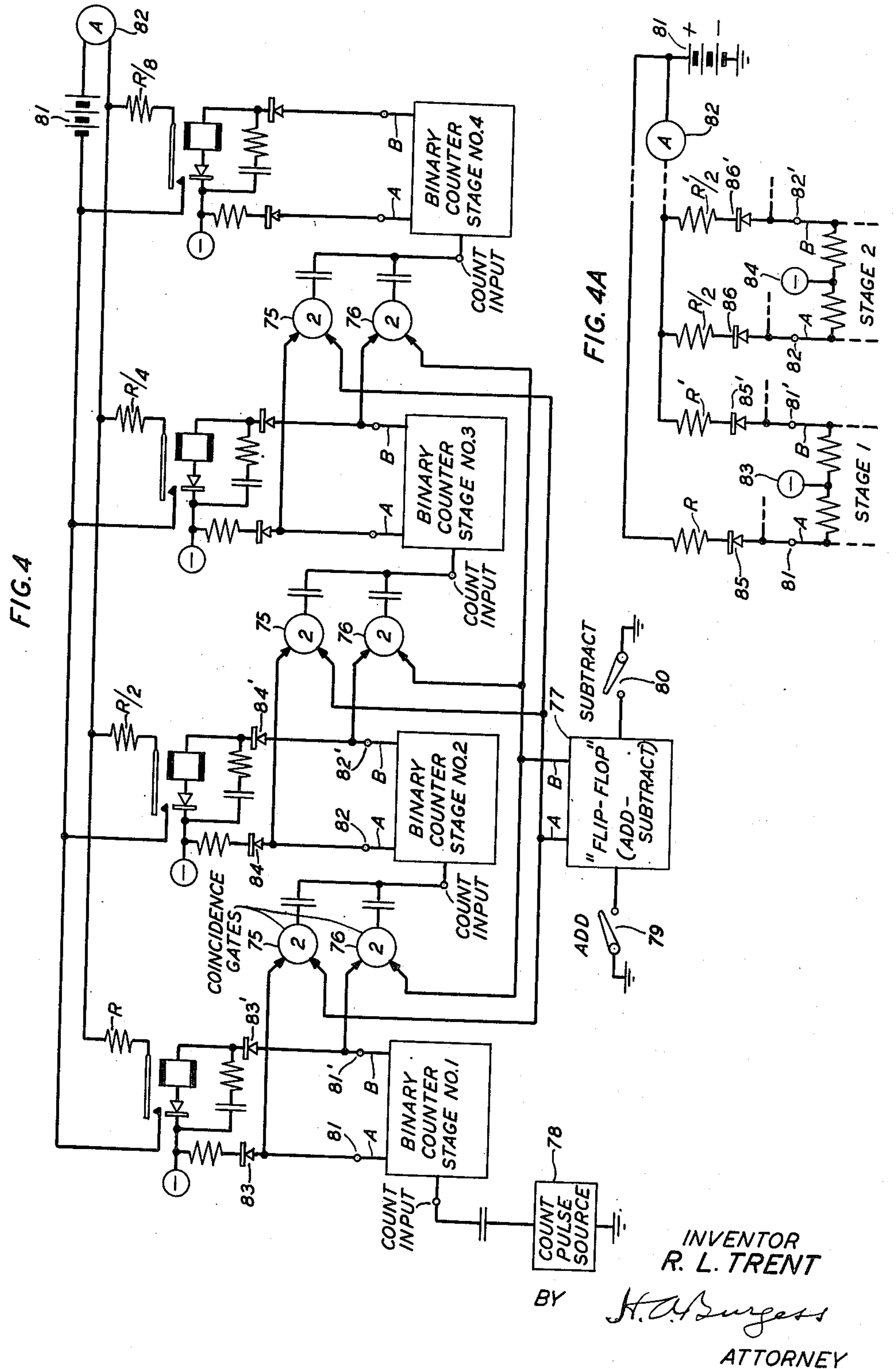
Fig. 4 illustrates schematically an application of the invention to a reversible binary counter.

Fig. 4 illustrates an application of principles of the invention to a reversible binary counter. The leads which register the states of the four binary counter stages are designated A and B. The states between which a lead will change are defined as "0" and "1" where the "1" is more positive than "0." The four counter stages may be identical with the one illustrated in Fig. 3.

Assuming that a counter stage is so arranged that it responds only to a positive pulse impressed upon its count input lead, a change in state from "1" to "0" of the output lead to which a count input connection to the following stage is made will cause no change in state of the following stage. However, a change in state from "0" to "1" will cause a positive pulse to be impressed upon the count input lead of the following stage, causing the latter to change states.

The coincidence gates 75 and 76 control the connection of the count input leads to the A or B output lead of the preceding stage. These gates are termed coincidence gates since they will deliver an output pulse only if both input leads are coincidentally enabled; gates of this type are described in a copending application of mine Serial No. 246,832, filed September 15, 1951, which issued as Patent 2,629,834, dated February 24, 1953. Diode gates of the type described in W. D. Lewis Patent 2,535,303, dated December 26, 1950, may alternatively be employed (with amplification if necessary). One input of each of the gates 75 is connected to the A lead of the preceding counter stage. The other input of each of these gates is connected to the A lead of a flip-flop 77 which may be similar to the binary counter stage shown in Fig. 3. Each remaining gate 76 is similarly energized by the B output lead of its immediately preceding counter stage and the B output lead of the add-subtract flip-flop. If the A lead of the (add-subtract) flip-flop is more positive than the B lead, the gates 75 will be partially enabled, and the gates 76 disabled. On the other hand, if the B lead of the flip-flop is more positive than the A lead, the gates 76 will be partially enabled and the gates 75 disabled. Transmission will therefore occur from the A or B lead to the count input lead of the succeeding stage, depending upon the state of the (add-subtract) flip-flop 77.

Assume now that the registry leads B of all stages are "0" and that the gates 75 are partially enabled under control of the flip-flop. A positive triggering pulse impressed upon the count input lead of the first stage from the count pulse source 78 will cause the first stage to assume the "1" state on its registry lead B. Since the A lead changes from "1" to "0", no positive pulse will be transmitted to the next counter stage and no further action will occur. A second count pulse applied to the first stage will cause this stage to change state again so that the registry lead B will assume the "0" condition. In this case, the A lead changes from "0" to "1", and the gate will be completely enabled and pass a positive pulse to the second stage, causing the latter stage to assume the "1" condition in its registry B lead. Count pulses 3 and 4 similarly cause further changes in state of the counter stages in a well-known manner.

Assume now that the add-subtract flip-flop reverses state so that the subtract gates 76 will be enabled instead of the add gates 75. Positive pulses will now be transmitted to the input leads of the succeeding stages when the B registry leads change from "0" to "1"; this action will cause successive pulses to subtract from the number standing in the stages. This may be seen from tracing through the action of each succeeding count pulse on the various stages.

The flip-flop 77 may be reversed to cause addition or subtraction as desired by applying pulses of proper polarity to the control leads of the flip-flop. These pulses may originate from a remote control or, as indicated in the figure, may be applied by momentarily closing either the add or subtract switch 79 or 80. These grounding switches 79 and 80 may be inserted in the circuit shown in Fig. 3 in place of the steering diodes 58 and 58'; closing either of these switches in effect applies a positive pulse to the base electrode of its respective transistor which normally rests at a negative potential.

The relays associated with the four counter stages are connected in the same manner as the relay 62 in the circuit of Fig. 3. These relays will be operated when their associated counter stages register a "1" on their B leads. By the rules of translation from decimal to binary codes, a "1" registered by the first stage has a weight of one unit, a "1" registered by the second stage has a weight of two units, a "1" registered by the third stage has a weight of four units, and a "1" registered by the fourth stage has a weight of eight units. To provide a means of registering the total count, there are connected in series with the armature of each relay four resistors proportioned as indicated in the drawing. The resistor associated with each successive stage is half as large as the resistor associated with the preceding stage. When the relay associated with the first stage is operated, a current of one unit will flow from the battery 81 through the ammeter 82 by way of resistor R. The operation of the relay associated with the second stage will apply a current of two units to the meter, etc. The ammeter will therefore represent the total count if calibrated in these units.

The principles of the invention as applied to the reversible binary counter shown in Fig. 4 permit it to operate at a fairly high rate, insures reliable operation by delivering large currents to the relays when they are to be operated, and reduces the current through the relay windings to a very small value when they are to be released, to prevent lock-up.

Fig. 4A illustrates a modification of the weighting network which eliminates the need of relays. The connections of only two stages have been illustrated; connections of succeeding stages follow in an obvious manner. Further, the circuit has been extended beyond the terminals 81, 81′ and 82, 82′, which correspond to similar terminals in Fig. 4, to show the collector supply batteries 83 and 84 (corresponding to the supply 50 in Fig. 3) within the counter stages. Separate collector supplies have been shown merely for illustrative purposes; a common supply would ordinarily be employed in practice.

In Fig. 4, the weighted currents are drawn solely from supply 81, through the weighted resistors R, R/2 etc. Supply 81 may be accurately regulated and precision resistors may be employed to provide highly accurate weighted current increments from each stage.

In Fig. 4A, the relay windings and associated compensating network elements connected by means of diodes to the registry leads B of the individual stages have been replaced by weighted resistors R′, R′/2 etc. In a similar fashion, the resistors connected to the A leads, which were equal in magnitude to the direct-current resistance of the relay windings to provide a balanced direct-current load to each counter stage, are replaced by weighted resistors R, R/2 etc.

Diodes 85 and 85′ and 86 and 86′ will conduct or not conduct depending upon the state of the associated counter stage due to the proportioning of battery 81 in relation to the collector supply voltage, 83—84. For example, if stage No. 1 is "off", the B lead will be at approximately —60 volts and the A lead will be at approximately —10 volts, as previously indicated. If the terminal voltage of battery 81 is less than the "off" value of —60 volts, say —40 volts, diode 85′ will remain in its high impedance condition and diode 85 will be in its low impedance conducting condition. Only the very small reverse current of the diode 85′ will flow through the resistor R′ and milliammeter 82. When stage No. 1 is "on" however, its B lead will rise to approximately —10 volts (see Fig. 2), the diode 85′ will conduct and a current, weighted by the resistor R′ and the forward resistance of the diode 85′, will flow through the milliammeter 82. Thus it is seen that while a particular stage will furnish a weighted current in both "on" and "off" conditions for reasons of symmetry of load conditions, only that derived from the registry lead B provides the useful output to the milliammeter 82.

The chief difference between the modified circuit of Fig. 4A and that of Fig. 4, apart from the elimination of the relays, is that the weighted currents of Fig. 4A are subject to variations in the transistors and diodes, and to variations in both the collector supplies 83, 84 and 81. The relays in Fig. 4 isolate the weighting network R, R/2 etc., and supply 81, from these latter variations so that a more accurate weighting may be obtained from this arrangement, particularly where a large number of stages are involved. The particular advantage of the use of the simple diode registration means, as illustrated by Fig. 4A, aside from cost, space and weight reduction due to elimination of the relays, is that of speed of operation. Operation of relays at repetition rates in excess of 100–200 cycles per second is not feasible at the present time due to finite operate and release times of the relay. The diode registration means permits operation at kilocycle rates, and will provide sufficiently precise current increments for many applications, particularly if but a few stages are employed.

Although the invention has been described as relating to specific embodiments and with reference to specific numerical values, it should be understood that these are merely illustrative and that further embodiments and modifications will readily occur to one skilled in the art.

What is claimed is:

1. A circuit for controllably supplying a direct current to a load comprising a transistor connected as a trigger circuit and having an "on" state and an "off" state, said transistor having an emitter electrode, a collector electrode, and a base electrode, and said trigger circuit including a source of direct current and a resistor connected in circuit with said collector and base electrodes, means for applying trigger pulses to said trigger circuit, a branch circuit connected in shunt with said source and said resistor, said branch circuit including said load, and an asymmetrically conducting impedance element, and means for biasing said asymmetrical element, said biasing means proportioned to bias said asymmetrical element in its high resistance condition in response to the collector potential in said "off" state and in its low resistance condition in response to the collector potential in said "on" state.

2. The combination in accordance with claim 1 wherein said load circuit comprises an electromagnetic relay having a winding and wherein said branch circuit includes said asymmetrical element and said winding.

3. The combination in accordance with claim 1 wherein said resistor and said source are proportioned to limit the power dissipation in the "off" condition to a safe value determined by the power dissipation characteristic of said transistor and wherein the resistance of said branch circuit is proportioned to limit the dissipation in the "on" condition to a safe value.

4. The combination of a transistor trigger circuit having an "on" state and an "off" state and comprising a transistor having an emitter electrode, a collector electrode and a base electrode, an emitter-base circuit, a collector-base circuit including a first resistor and a source of direct current and means for regeneratively coupling said collector-base and said emitter-base circuits, means for applying triggering pulses to said trigger circuit and a branch circuit connected in shunt with said source and said first resistor, said branch circuit including an asymmetrically conducting impedance element, a load circuit, and a second source of direct current proportioned to bias said asymmetrical element in its high resistance condition in response to collector voltages in said "off" state and in its low resistance condition in response to collector voltages less than a value intermediate the "off" collector voltage and the "on" collector voltage.

5. The combination in accordance with claim 4 wherein said load circuit comprises the winding of an electromagnetic relay.

6. A circuit for controlling the operation of an electromagnetic relay having a winding comprising a trigger circuit, said trigger circuit comprising a transistor having an emitter electrode, a collector electrode, and a base electrode, a first circuit including said emitter and base electrodes and a second circuit including said collector electrode, a resistor, a source of direct current and said base electrode, and means for promoting regenerative feedback from said second circuit to said first circuit over at least a range of emitter currents, said second circuit characterized by a safe power dissipation limit which varies in a hyperbolic manner as the voltage of said collector varies, means for applying trigger pulses to said trigger circuit, means connecting said winding in parallel with said first source and said resistor, and means for delivering substantially maximum power to said winding from said trigger circuit without exceeding the said safe power dissipation limit comprising an asymmetrically conducting impedance element connected in series with said winding, means for biasing said asymmetrical element in its high resistance condition when said trigger circuit is "off," means for biasing said asymmetrical element in its low resistance condition when said trigger circuit is "on" and said source and said resistor proportioned to limit the power dissipation in the "off" condition to a safe value.

7. In combination, a transistor trigger circuit having an "on" state and an "off" state and comprising a transistor having an emitter electrode, a collector electrode, and a base electrode; an emitter-base circuit; a first collector-base circuit including a resistor and a source of potential; means for regeneratively coupling said first collector-base circuit and said emitter-base circuit; a second collector-base circuit including, in series, as asymmetrically conducting impedance element poled for conduction in the forward direction in the direction of collector current flow in the "on" state, a load circuit and means for biasing said asymmetrical element comprising a source of direct current proportioned to bias said asymmetrical element in its high resistance condition for collector voltages below a value intermediate the collector voltage in the "on" state and the collector voltage in the "off" state and in its low resistance condition for collector voltages above said value.

8. An $n$ stage binary counter comprising $n$ tandem connected trigger circuit, each of said trigger circuits comprising a pair of cross-connected transistor trigger circuits; said transistors each having an emitter electrode, a collector electrode and a base electrode, an emitter-base circuit and a collector-base circuit; a relay for each of said $n$ trigger circuits each having a winding connected across the collector electrodes of its associated transistor trigger circuits; an asymmetrically conducting impedance element connected between each of said collectors and its associated relay winding; a current-responsive indicating circuit and means controlled by the operation of said relays for applying to said indicating circuit a current weighted in accordance with the binary significance of the trigger circuit controlling the application of said current to said indicating circuit.

9. The combination in accordance with claim 8 and means for biasing said asymmetrical impedance elements.

10. An $n$ stage binary counter comprising $n$ tandem connected trigger circuit, each of said trigger circuits comprising a pair of cross-connected transistor trigger circuits; said transistors each having an emitter electrode, a collector electrode and a base electrode, emitter-base circuit and a collector-base circuit; a current responsive indicating circuit, and an asymmetrically conducting impedance element and a resistor in series, connecting each of said collector electrodes to said indicating circuit, the said resistors associated with each trigger circuit being weighted in accordance with the binary significance of its associated trigger circuit.

ROBERT L. TRENT.

No references cited.